United States Patent [19]
Whittaker

[11] Patent Number: 5,935,200
[45] Date of Patent: Aug. 10, 1999

[54] EXPONENTIAL FUNCTIONAL RELATIONSHIP GENERATOR METHOD AND SYSTEM FOR IMPLEMENTATION IN DIGITAL LOGIC

[75] Inventor: Bruce Ernest Whittaker, Mission Viejo, Calif.

[73] Assignee: Unisys Corporation

[21] Appl. No.: 08/975,273

[22] Filed: Nov. 21, 1997

[51] Int. Cl.⁶ .................................................. G06F 7/556
[52] U.S. Cl. .................................... 708/606; 708/277
[58] Field of Search .......................... 364/753, 722, 364/735; 708/606, 277, 446

[56] References Cited

U.S. PATENT DOCUMENTS

| | | | |
|---|---|---|---|
| 4,225,933 | 9/1980 | Monden | 364/753 |
| 4,410,956 | 10/1983 | Yoshida | 364/753 |
| 4,521,868 | 6/1985 | Caldwell et al. | 364/753 |
| 5,177,702 | 1/1993 | Lindsley | 364/753 |

*Primary Examiner*—David H. Malzahn
*Attorney, Agent, or Firm*—Alfred W. Kozak; Mark T. Starr; Steven R. Petersen

[57] ABSTRACT

A system and method for developing a digital control signal Y for setting a target module (D) according to a digital setpoint signal A, a digital feedback signal C, a difference digital signal X=A−C in an exponential relationship, such that $Y=2^{X+1}-1$. An N bit digital signal X is translated exponentially via a simple, non-complex programmable array logic unit to an expanded N+q digital bit signal providing an exponentially expanded response for the control signal Y to reset the target module D to an optimally desired setting.

8 Claims, 9 Drawing Sheets

LINEAR FUNCTIONS

FIG. 12 ns and additionally, U.S. Ser. No.
EXPONENTIAL FUNCTIONAL RELATIONSHIP GENERATOR METHOD AND SYSTEM FOR IMPLEMENTATION IN DIGITAL LOGIC

CROSS-REFERENCES TO RELATED APPLICATIONS

This application is related to co-pending applications U.S. Ser. No. 08/980,358 entitled "Linear Function Generator Method With Counter For Implementation of Control Signals in Digital Logic", and additionally, U.S. Ser. No. 08/919,389 entitled "Digital Device Control Method and System Via Linear Function Generator Implementation Using Adder for Intercept", each of which are incorporated herein by reference.

FIELD OF THE INVENTION

This disclosure involves methods by which mathematical relationships involving exponential functions can be simply implemented in basic programmable digital logic devices.

BACKGROUND OF THE INVENTION

In the development of circuitry and control systems for digital devices, it has long been a problem as to how to sufficiently implement logic circuitry in order to provide control signals to regulate and control associated circuitry and to control a target digital device.

In earlier periods of technology, analog signals and analog circuitry were used to generate analog signals which could be transmitted to analog target devices in order to control their operation. With the advent of digital logic circuitry and with the great flexibility of use of Field Programmable Gate Arrays (FPGAs), and also with the use of Application Specific Integrated Circuits (ASICs), it is now possible that great efficiencies can be provided in using digital busses carrying multiple-bit digital signals which then can be digitally processed in order to provide the desired or required output signals or control signals for target digital devices.

Many of the Input/Output and control signals in digital circuitry will be seen to have mathematical relationships to each other. Thus, with the use of what are called functional relationship generators, which can efficiently be implemented in digital circuitry, it can be found that there is considerably greater efficiency in using various signals and parameters in order to develop a desired output control signal.

The presently described system and method illustrates how mathematical and functional relationships of digital signals in electronic circuitry can be represented by the use of simple, standardized, logic designed elements. These systems and methods can be built into simple, industry-standard programmable logic elements, for example, such as PALs (Programmable Logic Arrays), or Field Programmable Gate Arrays (FPGAs).

Figure 1A:
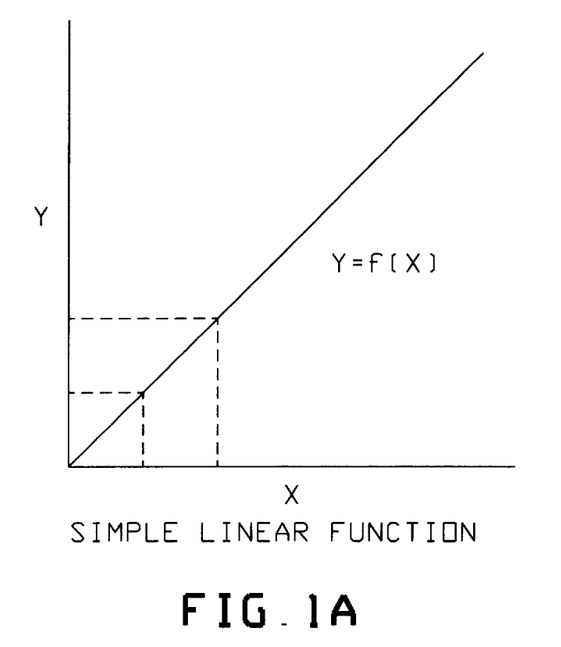
FIG. 1A is a graph showing a simple linear function.

Thus, as seen in FIG. 1A, there is indicated a graphical representation of simple linear functional relationship. Here, a value Y (vertical axis) is seen to be a basic function of X (horizontal axis). As X increases or decreases, the value Y increases or decreases in direct proportion.

Figure 1B:
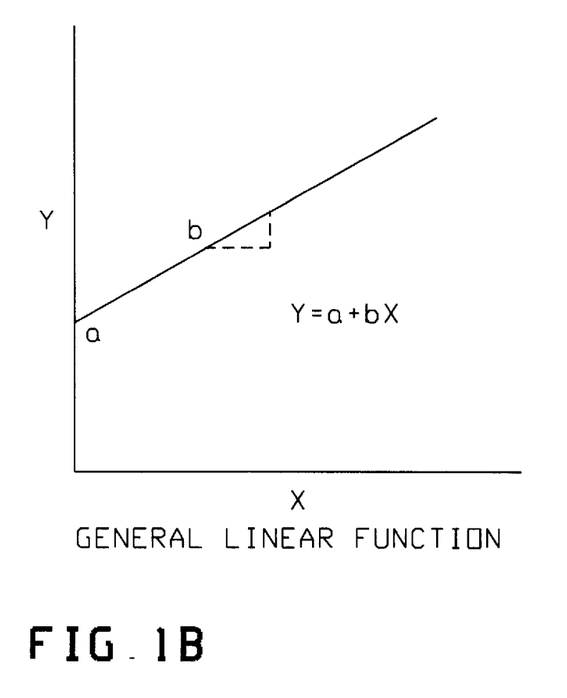
FIG. 1B is an illustration of a more generalized linear function.

Now referring to Fig. 1B, there is seen a more generalized linear function. Here, the relationship between Y and X are specified in their most general linear form by a particular equation:

$$Y=a+bX$$

where a = the intercept value of Y and b = the slope of the line involved.

Thus, it will be seen that when X has a value of 0 (X=0), then Y has a value of "a" (which is the intercept constant). The constant "b" (slope) controls how quickly Y will change as the value of X changes —that is to say, the slope of the linear line. The greater the "b" value, the steeper the line, and therefore the greater impact each change in X has on the value of Y.

In the simplified case of FIG. 1A, "a" has the value of 0 and "b" has the value of 1. Thus, when X=0, then Y is also 0 (Y=0). Also, in this case, for each unit change in the X, there is a direct unit change in the value of Y. These "linear" relationships and their digital implementation were the subject of the two previously indicated patent applications, which are incorporated by reference.

Figure 2:
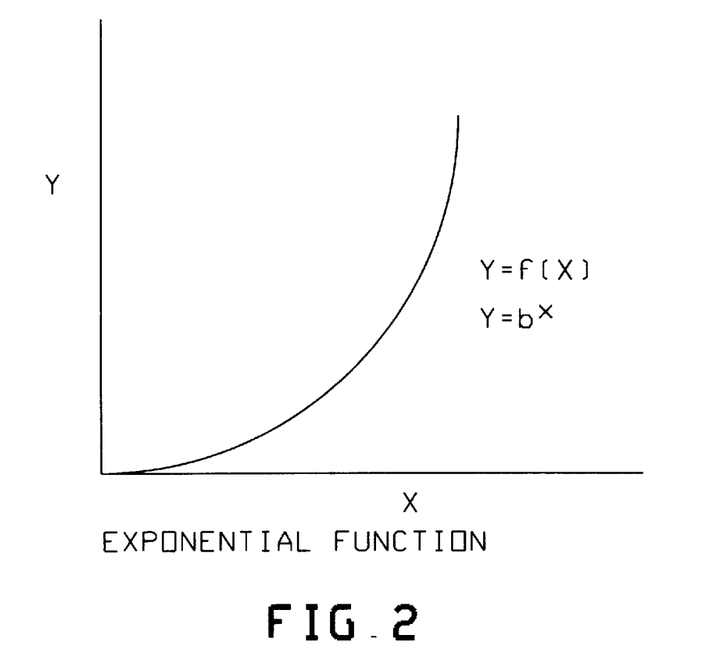
FIG. 2 is a graphical representation of a simple exponential functional relationship.

In the instant case, the focus of the present disclosure will involve the "exponential relationship". FIG. 2 shows the graphical representation of a simple exponential functional relationship. Here, the vertical value, Y, varies "exponentially" with regard to the horizontal variable X. An exponential relationship implies a growing and expanding significance to the increasing values of the independent variable X. That is to say that, each time X increases and grows, its relationship effect on Y increases considerably more. The power of this function is that when X is near to the origin 0, FIG. 2, then changes in X will have a very little effect on the value of Y. However, when X is farther away from the origin point 0 of FIG. 2, (also FIG. 11), then small changes in X will have a very great effect on the value of Y. Such a relationship might be very effective in a device control system to correct for deviations from some standard value at the origin. The further away from the standard (value of X), the greater force (Y) that is needed to be applied to bring it back to a standard control point.

The exponential relationship involved in the present disclosure can be represented as a function of some constant value raised to the power of X. In this particular situation of FIG. 2, the constant "b" is not the slope of the linear functions of FIGS. 1A, 1B, but rather now is used to represent a numerical base which is raised to the X power. In a digital system as seen in FIG. 2, the constant "b" is chosen to be the number "2", since "2" is the base of binary numbers. Thus, Table I below, gives the value of Y for some values of X, showing and illustrating the exponential growth. Thus here, $$Y=f(b^x)$$

TABLE 1

EXPONENTIAL VALUE RELATIONSHIPS

| X | Y = $2^X$ | change factor $Y_n$ to $Y_{n+1}$ |
|---|---|---|
| 0 | 1 | N/A |
| 1 | 2 | 1 |
| 2 | 4 | 2 |
| 3 | 8 | 4 |
| 4 | 16 | 8 |
| 5 | 32 | 16 |
| 6 | 64 | 32 |
| 7 | 128 | 64 |
| 8 | 256 | 128 |

SUMMARY OF THE INVENTION

A system and method is provided whereby a simple and efficient digital implementation can be provided for exponential functions between related inputs and outputs in electronic circuitry.

A low digital valued input can be implemented so as to derive a high valued digital (multiple bits) output signal on an exponential relationship whereby small value changes in the input can generate very large changes in the output and which signals can be implemented with digital bit signals which reflect the relationship between the small input signal (and its small number of bits of input) to the large output signal and large number of digital bits of output. Thus, an input bus signal of mi bits will later be reflected as an expanded output bus signal of mo bits to provide the high value sensitivity required for the output signal, where mo is a greater number than mi.

Since binary notation permits value changes to be reflected by the insertion of bit positions, usage is made of this relationship in order to permit simple logic circuitry to amplify small digital input signals into large digital output generated signals as represented by the binary digital notation.

DESCRIPTION OF THE PREFERRED EMBODIMENT

Figure 3:
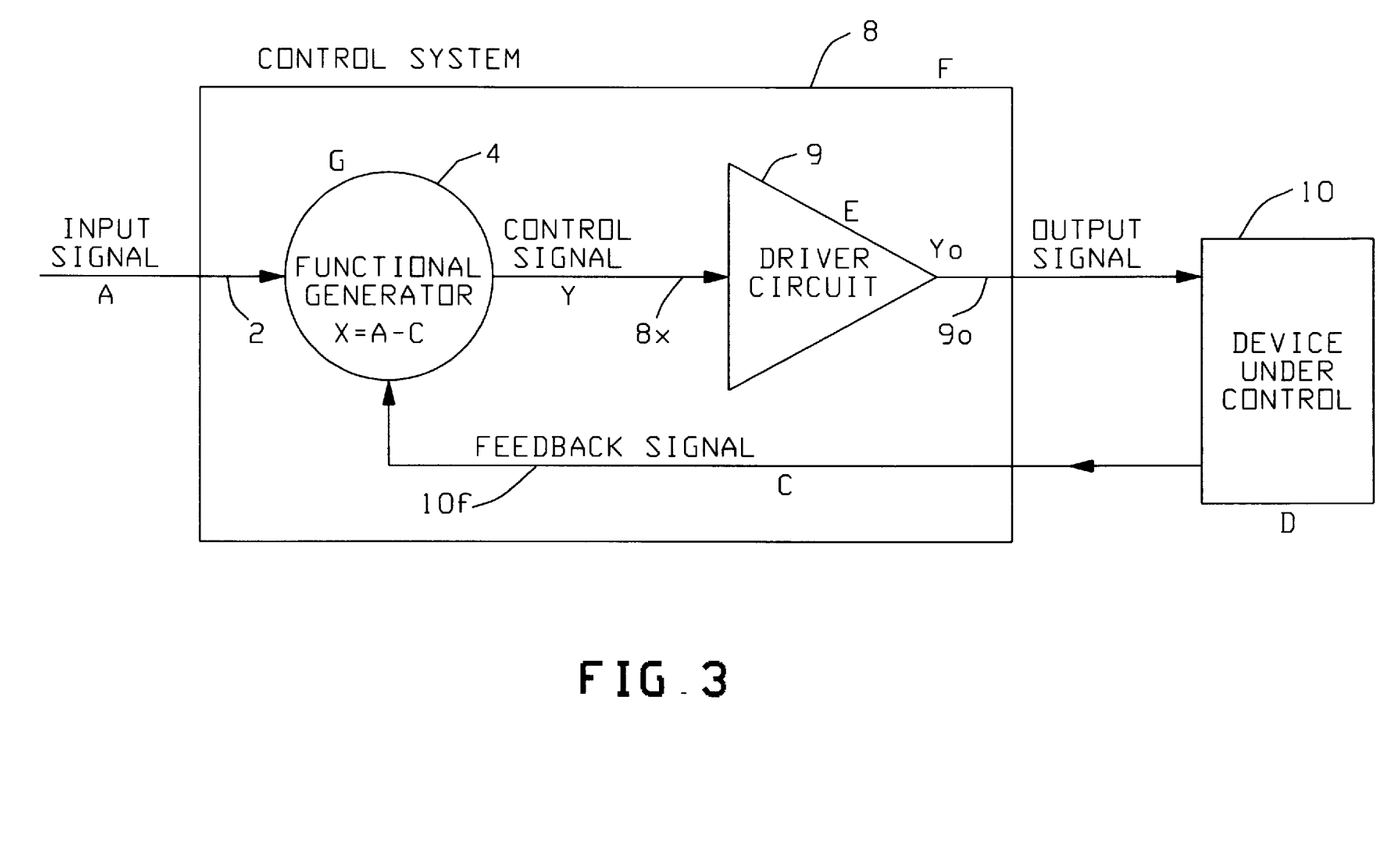
FIG. 3 is a block diagram of a general control system.

A functional block diagram of a general control system is illustrated in FIG. 3. Block D is a device 10 or item to be controlled. This could be a positional motor, a frequency generating or other conceivable device. The signal B is the output signal designated Yo, which is the output signal on line 9o of the control system 8. Internal to the control system 8 will be seen a driver circuit 9 which creates the output signal Yo from its input signal 8x (control signal). The control signal 8x is derived from the functional generator circuit 4. The functional generator circuit 4 receives two inputs from which it creates the signal Y on line 8x. The two inputs include the input control signal A on line 2 from a controller or operator, and the feedback signal C on line 10f from the device 10 under control.

The present disclosure concerns itself with the functional relationship of block 4 (functional generator) and the output signal Y on line 8x. For any normal control system, the feedback signal C on line 10f is "negative feedback". That is to say, it subtracts in some way from the input control signal on line 2, thus to create the control signal Y on line 8x. Thus, if the device under control, 10, is exactly where the operator's input control signal A on line 2 desires it to be, then the feedback signal C on line 10f should subtract from the input signal A so as to cause signal Y on line 8x to be "null" in value, and thus have no effect on the device 10.

Figure 4:
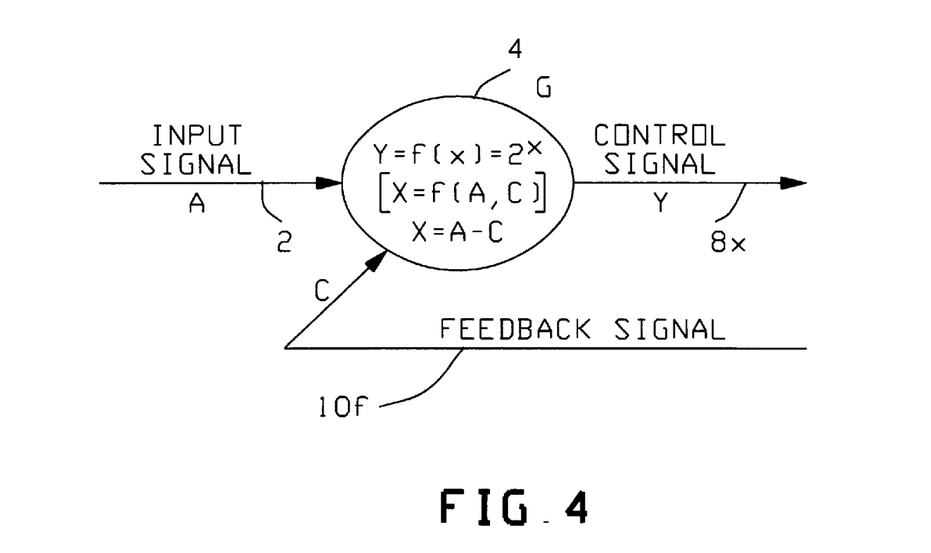
FIG. 4 is a general diagram of a function generator circuit.
Figure 5:
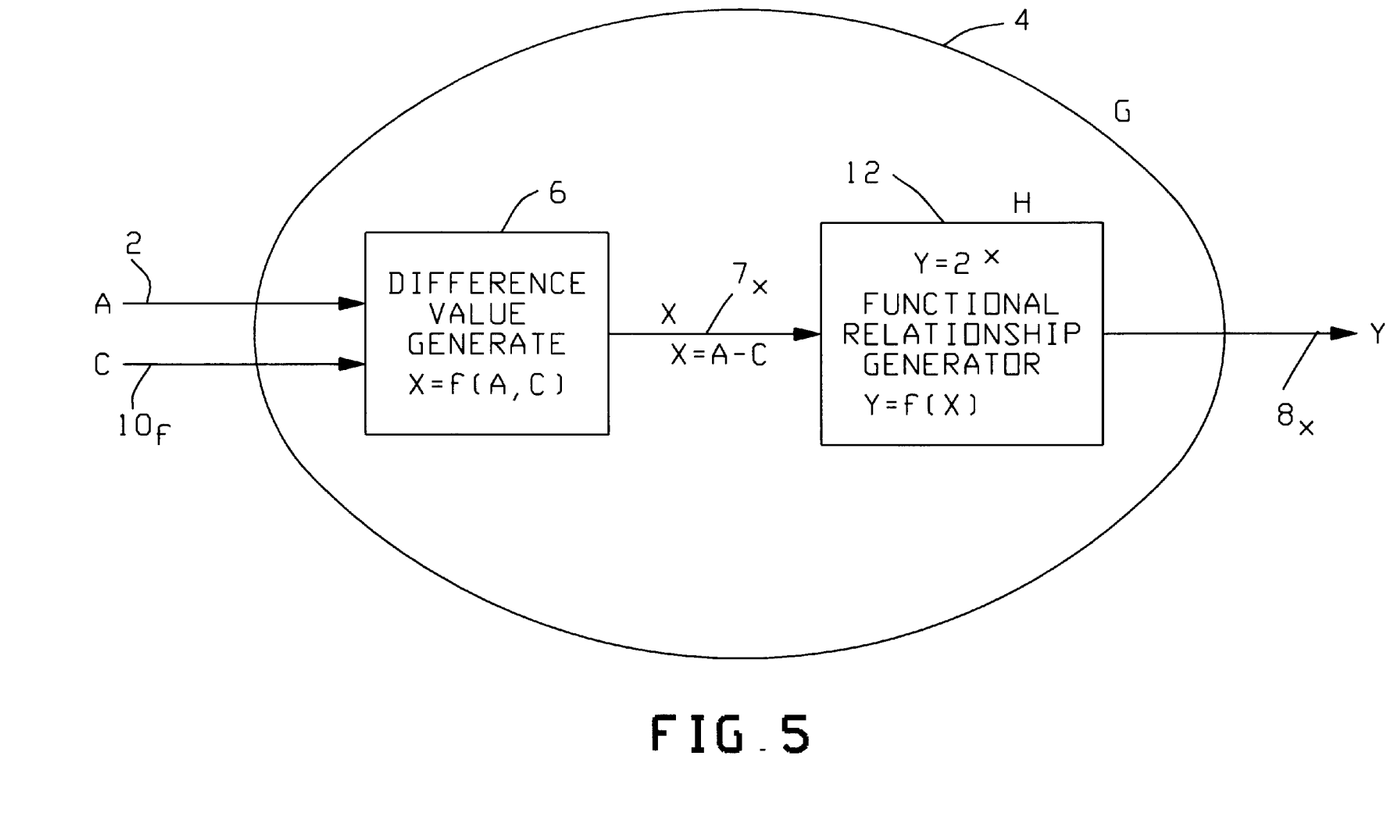
FIG. 5 is an illustration of the function generator providing a difference value X from input signals A and C.

FIG. 4 shows a general diagram of a functional generator circuit, 4. This circuit receives the input control signal A on line 2 and also receives the feedback signal C on line 10f. From these inputs, the circuit then creates the "difference variable" X internal to the function generator (FIG. 5). Then, from the signal X on line 7x, the circuit creates the output control signal Y on line 8x. As indicated in FIG. 5, the signal Y is an exponential function of the difference variable X, that is to say, it is related by powers of 2.

The difference variable signal X (internal to function generator) of FIGS. 3, 4, 5 can be created either by a method called the subtraction method, or a method called the counter method, which have been described in the co-pending cross-referenced applications. If the counter method is used, then the parameter "a" (FIG. 6) is set to a zero value for exponential function work.

Signal Yo on line 9o (FIG. 3) is derived directly from signal Y on line 8x. Yo is simply driven to the necessary voltage and power levels by the driver circuit 9 (FIG. 3).

Figure 8:
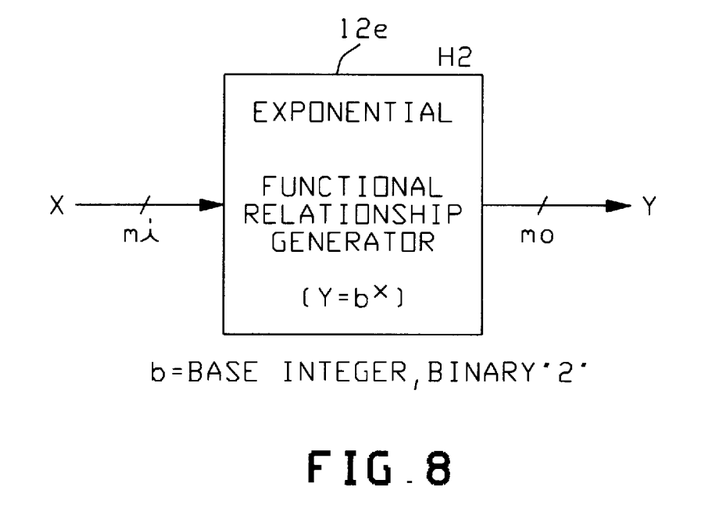
FIG. 8 is a block diagram illustrating an exponential relationship generator.

It can be imagined that the generation of the controlling signal Yo on line 9o of the control system 8 of FIG. 3, can take on many forms depending on the nature of the device 10 which is under control. FIG. 4 shows that the signal X is some function of both A and C, as seen in the functional generator 4 of FIG. 4. The Y signal is a function there of X, which in this case will be such that X is an exponential as seen in FIG. 8. The type of function depends upon the specific application. This function could be one or another of two of the different mathematical relationships mentioned previously, that is to say, a linear relationship (FIG. 1B) or exponential relationship (FIG. 2). The implementation of the exponential relationship, in terms of digital logic, is the focus of the present disclosure.

In the control system of FIG. 3, the signal A and the signal C combine subtractively (A−C) to form a single value which can be called signal X. Since signal C is a negative feedback, then the signal X is formed as the difference between A and C. Thus, . . . X=A−C.

If the desired functional relationship between the controlling signals Y and the difference variable signal X is to be linear, then in such a case, the controlling signal Y would vary in a smooth, straight-lined fashion relative to the difference value X. Such a relationship was shown in FIGS. 1A, 1B. Such a functional relationship would say that no matter how far off from the null point (X=0) the device may be, the controlling signal Y will only be as large as the slope "b" (FIG. 1B) that the straight linear line provides.

On the other hand, in some applications it is desirable that only a very gentle, corrective force be applied (Y is a small value) when the difference is small (that is, X is small); and a much stronger force should be applied (when Y is much larger) when the difference is larger (X not as small). This functional relationship between Y and X is the "exponential" relationship mentioned heretofore as the focus of this case. Table I (on exponential value relationships) for example, showed that for each unit increase in the difference value of X, that the strength of the signal Y doubles itself from its previous value.

It can be seen that such a functional relationship might be desirable in various operations, and that the simple, digital logic implementation of such mathematical relationships would prove to be very valuable in the utilization, especially when it utilizes simple, standard "off-the-shelf" programmable, digital devices with no need for analog circuitry.

Difference Value Generation of Signal X: In order to implement the FIG. 5 functional generator element 4 into digital logic, the first item that must be created is the difference value X. As seen for a negative feedback control system, X is the difference between the input control signal A on line 2 and the feedback signal C on line 10f. The two basic methods of creating a digital value (in this case a byte of 8 bits) representing the value of the signal X from the signals A and C, were discussed and developed in the heretofore mentioned copending patent applications which were incorporated herein by reference.

Exponential Function—Implementation: As with the linear function generator, once the difference value X has been generated, then the Function Generator 4 of FIGS. 4 and 5 can be used to generate a desired output signal Y on line 8x.

Figure 6:
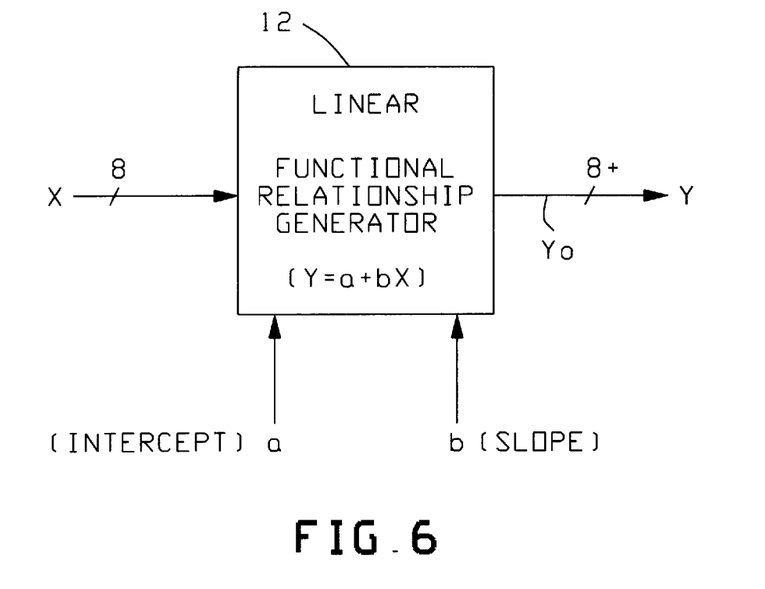
FIG. 6 is an example of a functional relationship generator for linear relationships.

FIG. 6 shows a functional relationship generator (for a "linear" relationship as in FIGS. 1A, 1B) having a signal input X (X=A−C) in addition to having inputs "a" (intercept value) and also "b" (slope value) which feed the functional relationship generator to develop the output Yo.

FIG. 5 shows the Functional Generator 4(G), whereby input signals A and C feed a difference value generator which generates the signal X which then feeds the relationship generator 12 (H) in order to provide the output signal Y. In this situation, the focus is now on the non-linear exponential version (FIG. 8) of the functional relationship generator H, 12, of FIG. 5..

Referring to FIG. 2, there was shown the exponential relationship between an independent variable X and a dependent variable Y. Here, the basic equation is: $Y=b^x$, where b is the base binary integer=2.

Thus, Y is a constant "b" raised to the power of X. Since the implementation involves digital logic, the constant "2" is used.

In binary notation, the digital logic of multiplication by powers of 2 is accomplished by simply shifting a binary number to the left or to the right by a few bit positions. Thus, if the binary value of X is shifted one position to the left to create Y, then X multiplied by 2 gives the value of Y. If X is shifted two positions to the left to create Y, then X multiplied by 4 gives Y and so on.

Figure 7:
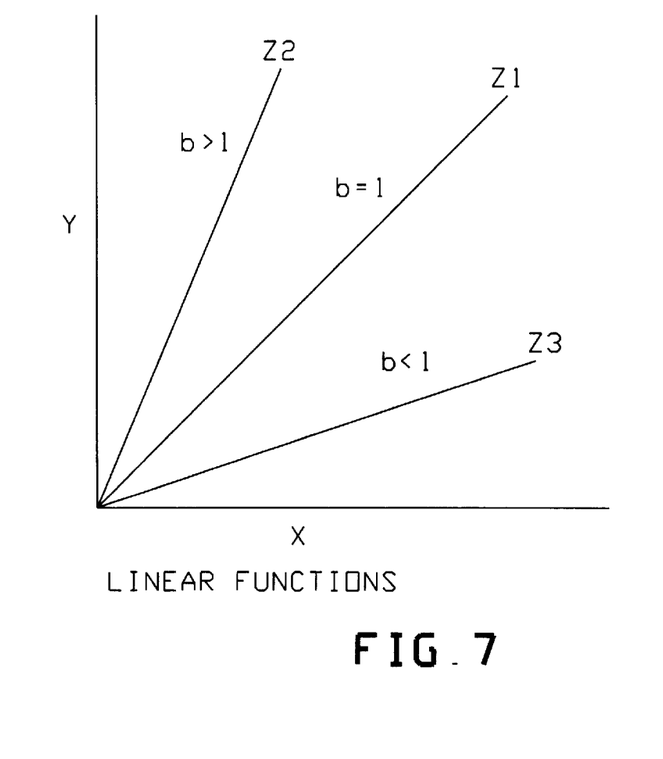
FIG. 7 is a graph illustrating linear functions with different slope values (b)

A simple example of bit position shifting can be illustrated in the situation where X and Y have a "linear" relationship according to a slope "b" as seen in FIG. 7. FIG. 7 shows the "linear" relationship between X and Y for three cases of the slope "b" element. The first graph line Z1 is for a unity slope where "b"=1. This is the simple cases where X is related directly to Y, that is to say Y=X. The second graph line Z2 is for slopes greater than 1 (for example 2 or 4). In such a case Y is greater than X by the multiplication factor (for example two times greater or four times greater). The third graph line Z3 is for slopes less than one (for example, one-half or one-quarter). In such a case Y is smaller than X by this factor (for example: one-half of X or one-fourth of X). In this example, Table I-A below will illustrate values for slope "b" values where use is made of the value X to create the appropriate value of Y, as per FIG. 1B.

TABLE I-A

LINEAR RELATIONSHIP BETWEEN X and Y WITH SLOPE "b"

| "b" slope | X | Y | X to Y (binary) |
|---|---|---|---|
| 1 | 1 | 1 | 0000 0001 to 0000 0001 (no shift) |
| 1 | 5 | 5 | 0000 0101 to 0000 0101 (no shift) |
| 2 | 1 | 2 | 0000 0001 to 0000 0010 (shift left 1 place) |
| 2 | 5 | 10 | 0000 0101 to 0000 1010 (shift left 1 place) |
| 4 | 1 | 4 | 0000 0001 to 0000 0100 (shift left 2 places) |
| 4 | 5 | 20 | 0000 0101 to 0001 0100 (shift left 2 places) |
| 8 | 1 | 8 | 0000 0001 to 0000 1000 (shift left 3 places) |
| 8 | 5 | 40 | 0000 0101 to 0010 1000 (shift left 3 places) |
| ½ | 6 | 3 | 0000 0110 to 0000 0011 (shift right 1 place) |
| ¼ | 20 | 5 | 0001 0100 to 0000 0101 (shift right 2 places) |

Then as was indicated in the co-pending cited cases, in binary logic, the digital multiplication by powers of "2" is accomplished by shifting a binary number to the left or to the right by a few bit positions. Thus if the binary value of X is shifted one position to the left to create Y, then X multiplied by 2 gives Y. Likewise if X is shifted two positions to the left to create Y, then X multiplied by 4 gives Y and so on. It will be noted in the "unity" case where b=1, this is implemented by making all the bits of Y directly equal to the bits of X and thus there is no shifting required in either direction.

Now after this illustration of bit shifting in Table I-A, for linear relationships, it will hereinafter be shown how the digital bit shifting operation for expanded digital sensitivity can be applied to exponential relationships.

FIG. 8 is a simplified block diagram showing the exponential relationship function generator 12e (H2). In FIG. 8, it is seen that there is an incoming binary field X (of mi bits) that produces some new value in the output binary field Y (of mo bits). Thus, there are two binary fields involved. The input field seen to be mi bits for the signal X, and mo bits for the signal Y, respectively.

In the "linear" relationship between Y and X, the widths of these two fields, mi and mo, could easily be the same width, for example, a byte width of 8 bits. However, in the case of an "exponential" relationship, it will be seen that the value of Y will grow very quickly relative to the value of X, and thus the signal Y (in digital bits) must be much wider than the digital bits representing the signal X, so that the signal Y can digitally represent the much larger value.

In the following example, it will be assumed that the value of X is to be 3 bits wide, that is to say, mi is equal to 3 bits, and that the signal Y is assumed to be 8 bits wide, such that mo=8. Since usage is made of the powers of 2 (base b=2), the signal Y can hold all the values generated by $2^x$. The Table II shown below will illustrate these values.

TABLE II

| X (3 bits) | $Y = 2^X$ (8 bits) |
|---|---|
| 0 | 1 |
| 1 | 2 |
| 2 | 4 |
| 3 | 8 |
| 4 | 16 |
| 5 | 32 |
| 6 | 64 |
| 7 | 128 |

As will be seen in Table II, for each single bit value of X represented by the 3 bits of X, it will be seen that the larger width value of signal Y requires 8 bits. Thus, by noticing the rapid growth of the value of Y relative to X (Table II), a resultant indication is made of the power of the exponential relationship.

Now, as far as deriving the "implementation" of this function, a simple, insignificant change can be made to the basic equation which permits a very simple implementation in hardware. Thus, the equation is now changed to be:

$$Y = b^{X+1} - 1. \text{ (where b—base 2)}$$

This type of modification does not affect the application of the implementation, but makes the circuit design for implementation in digital logic to be exceedingly simple.

Table III shown below indicates the relationship between the signal X and signal Y with this modified equation, where $Y = 2^{X+1} - 1$.

TABLE III

| INPUT<br>X<br>(3 bits) | RELATIONSHIP<br>$Y = 2^{X+1} - 1$ | OUTPUT<br>Y<br>(8 bits) |
|---|---|---|
| 0 | 1 | 0000 0001 |
| 1 | 3 | 0000 0011 |
| 2 | 7 | 0000 0111 |
| 3 | 15 | 0000 1111 |
| 4 | 31 | 0001 1111 |
| 5 | 63 | 0011 1111 |
| 6 | 127 | 0111 1111 |
| 7 | 255 | 1111 1111 |

Again, the rapid growth of the value of signal Y (in binary) relative to signal X (in binary) is clear. It is seen how signal Y can hold almost twice as large a value. Most importantly, observing the binary pattern of Y, reveals a simple "spreading of 1's" growth. This type of digital information can be built into logic gates in a very simple manner, as will be seen in FIG. 9..

Shown below is Table IV which gives the logical equations for the Y bits, designated as Y(o) for the least significant position. It is to be noted that in Table IV, the "/" denotes inversion; the "*" denotes the logical AND function; and the "+" denotes the logical OR function.

TABLE IV

LOGICAL EQUATIONS FOR Y BITS OUTPUT

| | | |
|---|---|---|
| Y(0) | = | "1" |
| Y(1) | = | X(2)/ * X(1)/ * X (0)/ |
| (Y2) | = | X(2)<br>+X(1) |
| Y(3) | = | X(2)<br>+X(2)/ * X(1) * X(0) |
| Y(4) | = | X(2) |
| Y(5) | = | X(2) * X(1)<br>+X(2) * X(0) |
| Y(6) | = | X(2) * X(1) |
| Y(7) | = | X(2) * X(1) * X(0) |

Figure 9:
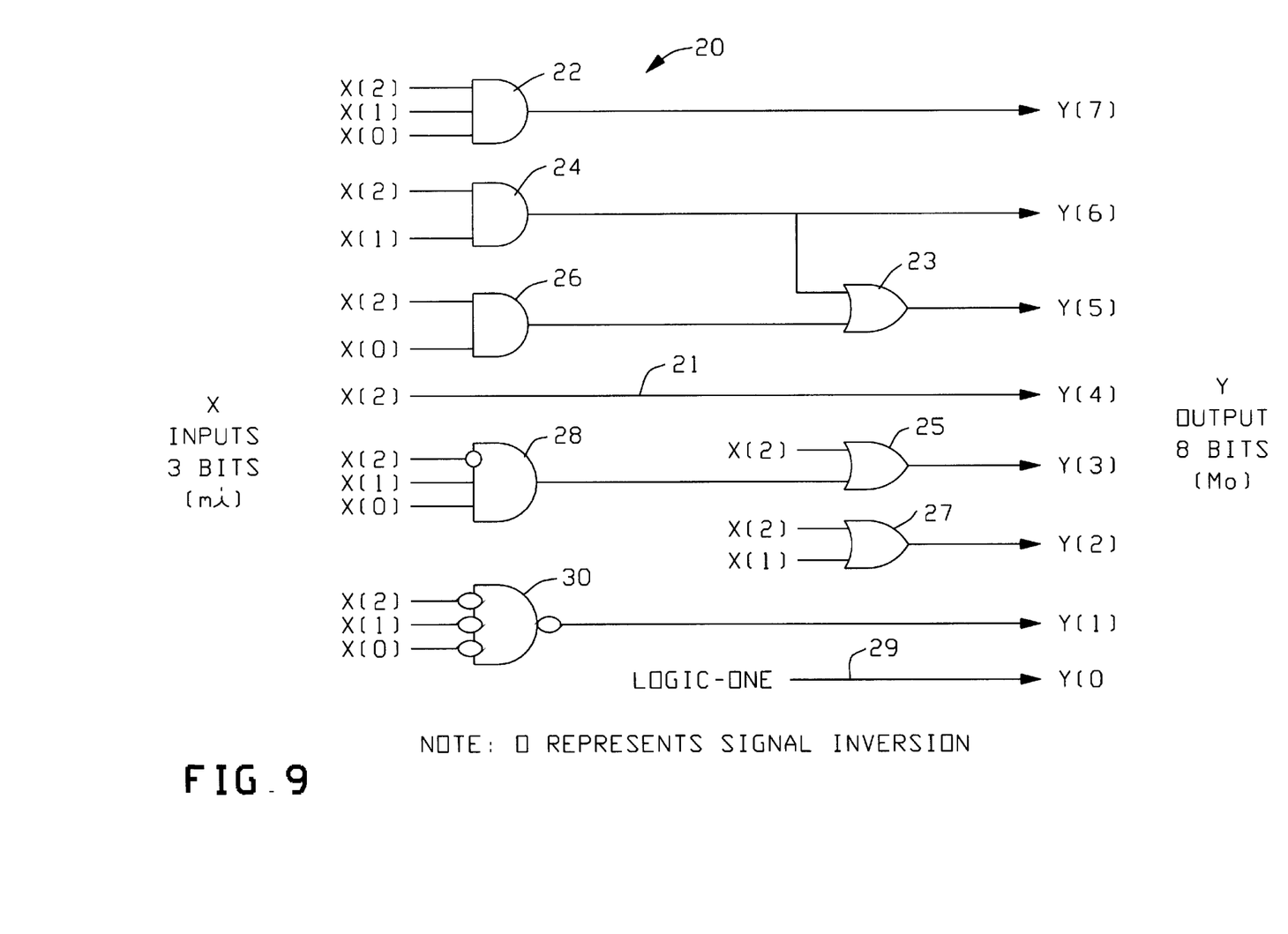
FIG. 9 is an illustration of an eight gate exponential logic circuit for implementation of an exponential generator.

As seen, Table IV reveals the simple logic equations required to digitally implement the exponential relationship. Further, FIG. 9 shows an illustration, via schematic diagram, for this type of simple circuit. Thus, the above 3-bits transformed over to the 8-bit exponential conversion function is seen to be implemented in 8 simple, logical gates.

FIG. 9 illustrates the implementation 20 for the exponential logic function where a 3-bit bus (mi) carries the X inputs (X2, X1, X0) in order to generate an 8-bit output bus (mo) to carry the Y output signal (Y7, Y6, Y5, Y4, Y3, Y2, Y1, Yo).

A series of AND gates 22, 24, 26, 28 plus a NAND gate 30 accept various of the 3-bit X inputs. OR gate 23 receives inputs from AND gates 24, 26 while OR gate 25 receives an input from X2, and AND gate 28, while X2 on line 21 and logic-one on line 29 feed directly to the Y output as Y4 and Yo, respectively.

Thus, a 3-bit input signal X has now been converted to an 8-bit output signal Y on an exponential relationship where Y=to the base 2 raised to the X power, i.e. $Y = 2^X$.

Thus, if larger values of Y are required, the above concept of FIG. 9 can be simply expanded accordingly, by using extra bits to represent the digital signal X or the digital signal Y.

Figure 10:
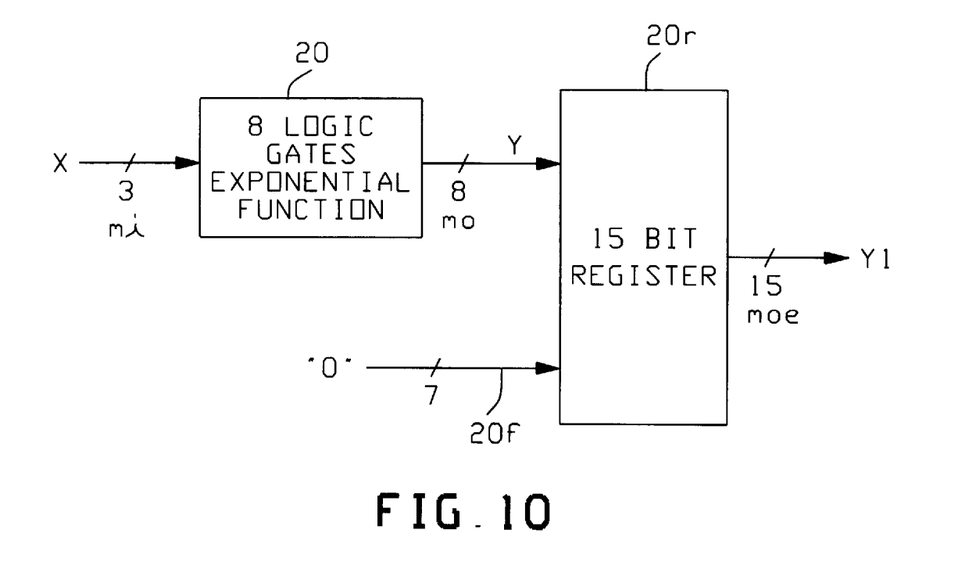
FIG. 10 is an illustration of using an eight logic gate exponential generator with a register in order to expand the bit values of the output signal Y.

Further, however, even larger values of Y can be obtained (with slightly less resolution, usually acceptable) by merely "offsetting" the above-calculated signal Y with the lower bits set to either 0's or 1's. The new value formed by offsetting Y, is called Y1. Table V shown below, demonstrates such an offsetting by making a value Y1 effectively 15 bits wide by merely offsetting the signal Y by 7 bit positions, and then filling the lower bits with zeros. This is seen in FIG. 10 where the register 20r receives a 7-bit input 20f which inserts the "0's".

TABLE V

| X<br>(3 bits) | Y<br>(decimal) | Y<br>(binary) | Y1<br>(decimal) | Y1<br>(binary) |
|---|---|---|---|---|
| 0 | 1 | 0000 0001 | 128 | 000 0000 1000 0000 |
| 1 | 3 | 0000 0011 | 384 | 000 0001 1000 0000 |
| 2 | 7 | 0000 0111 | 896 | 000 0011 1000 0000 |
| 3 | 15 | 0000 1111 | 1920 | 000 0111 1000 0000 |
| 4 | 31 | 0001 1111 | 3968 | 000 1111 1000 0000 |
| 5 | 63 | 0011 1111 | 8064 | 001 1111 1000 0000 |
| 6 | 127 | 0111 1111 | 16256 | 011 1111 1000 0000 |
| 7 | 255 | 1111 1111 | 32640 | 111 1111 1000 0000 |

Thus in Table V, there is seen a very rapid exponential growth (in digital expression) of Y1 relative to X. Again here, the simple offsetting method allows very large values of Y1 to be created from the very small values of X, but with slightly less resolution. Again, the above Table V, is implemented with the identical 8 logic gates of FIG. 9 as before, with merely the inclusion of forcing the lower bits to become zero, as seen in FIG. 10. Thus in FIG. 10, the input signal of 3 bits can be processed by the eight logic gates of the exponential logic 20 to result in an output signal Y of 8 bits which subsequently can have the use of a 15-bit register 20r to add zeros, so that the final output value for Y (designated as Y1) can now consist of 15 bits.

Thus, seemingly complex mathematical functional relationships between two values such as X and Y, can be seen to be implemented in a simple fashion with a very minimal amount of standard digital circuitry. These can be implemented in off-the-shelf programmable devices, such that any small, standard, PAL (Programmable Array Logic) device could be used, or in other cases, a small portion of a Field Programmable Gate Array (FPGA) could be used. These types of devices are easily acquired from companies such as XILINX Company, or Altera Company of San Jose, Calif.

Figure 11:
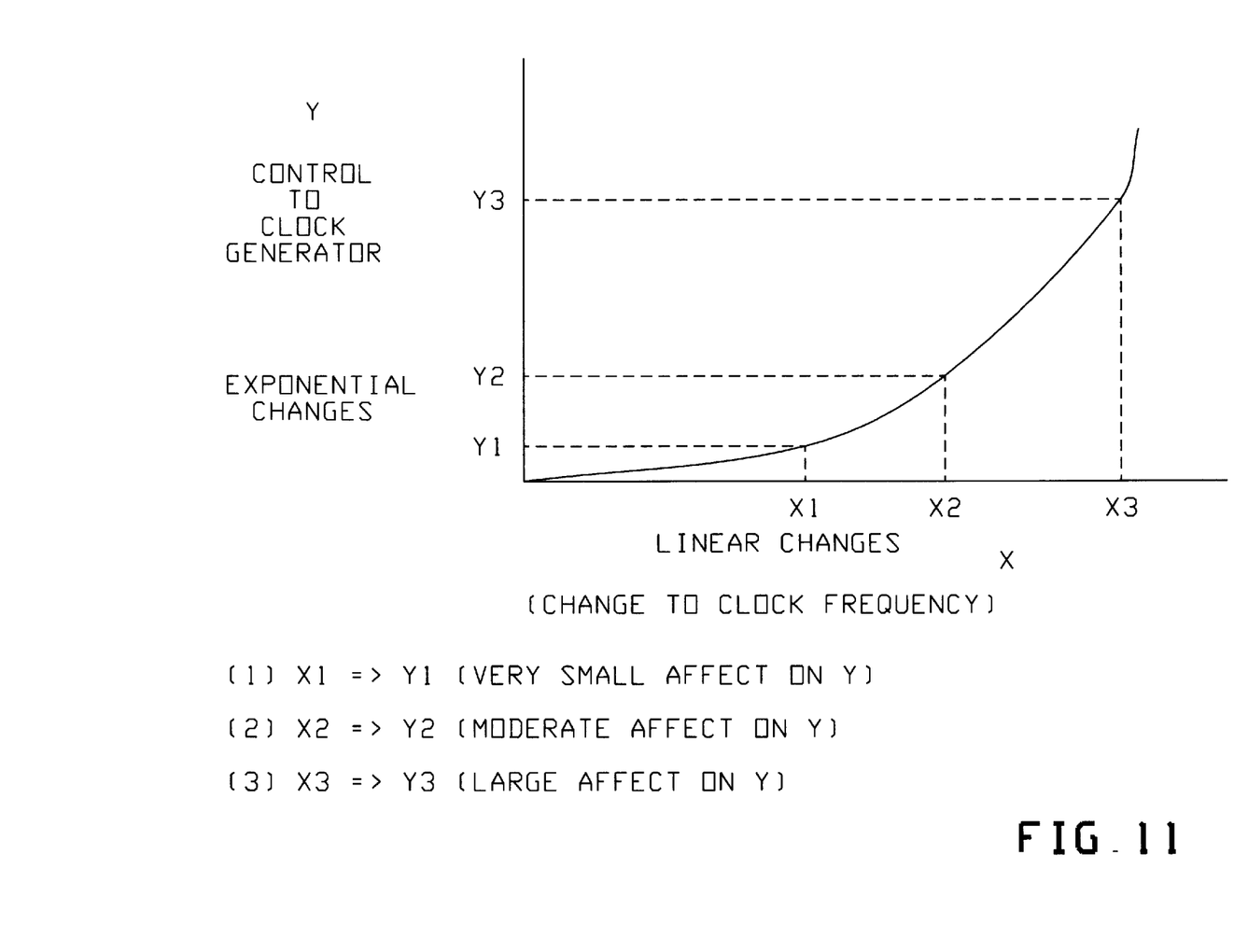
FIG. 11 is an illustration of exponential changes in the Y signal in relationship to changes in the X signal.

An illustrative example of how small changes in the value of X can have large changes in the value of the output signal Y, is seen in FIG. 11, where a small change in X, such as X1, will have a very small effect on Y's value such as Y1. However, a moderate change such as X2, in the value of X can have a much larger change in the value of Y2. Then subsequently, when there is a large change in X, such as to X3, there will be a greater expanded change in the value of Y shown as Y3.

Figure 12:
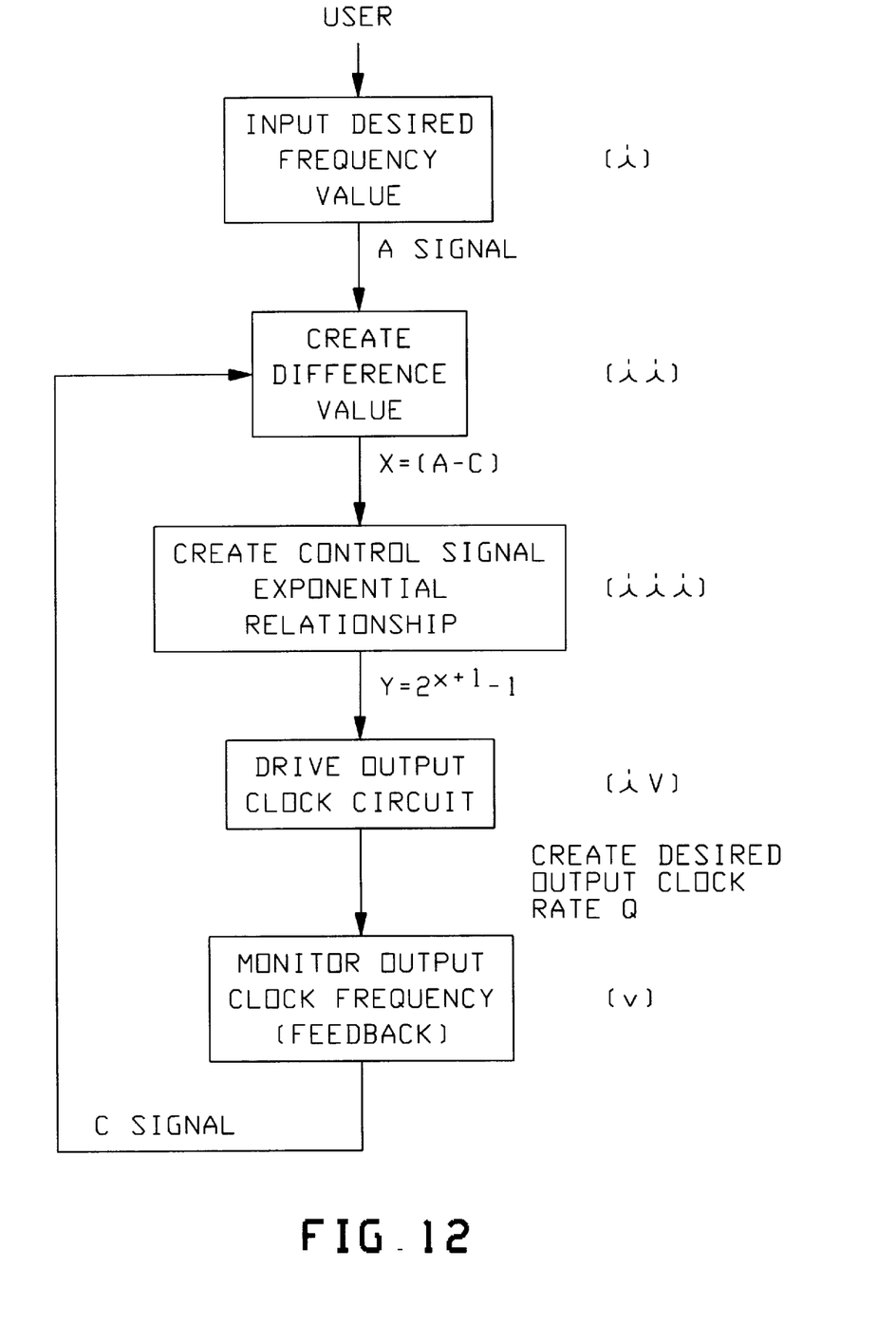
FIG. 12 is a flowchart illustrating the utilization of the simplified circuitry in order, for example, to monitor an output clock frequency.

The control system F of FIG. 3 can be used for a number of device implementations as will be illustrated in the flow chart of FIG. 12. If the device 10 under control (D) were a variable clock oscillator at marker (v) of FIG. 12, (similar to VCXO devices where VCXO represents a voltage controlled oscillator), then such a control system could be used to create a stable output clock of frequency Q at (v). This clock output could be variable in frequency under the initial control of the user's input signal A from marker (i) in FIG. 12.

Such a user input could represent the "desired frequency" Q of the output clock of FIG. 12. "A" could be a binary number, a stream of clock pulses, or a data stream, or some level indicating the desired output frequency, Q, at (v).

The output clock of frequency Q would be then fed back as signal C into the control system at marker (ii). Thus, from signal A and signal C, a difference variable value X could be created to feed the exponential control logic at marker (iii). For example, if the output frequency is already exactly at the desired frequency, the difference between the desired value A and the actual value C is zero; thus X=0. At this point, the output would be held stable.

If the output frequency is not yet at the desired value of Q, then there will be some value resident in the signal X from marker (ii) to marker (iii) This X value will result in some generated value in Y, which will result in the output frequency changing in the desired direction.

Then from the signal X, there can be created at marker (iii), a functional control signal Y, which is "exponential" in its relationship to X, such that $Y=2^{X+1}-1$. Thus, when X is very small (that is very close to the desired output), then Y will also be very small, that is to say, it will have very little effect on the output Q. However, if X is farther away from zero, then signal Y grows exponential, that is to say, at a much faster rate than X. Thus in this case, the signal Y will have a much larger impact on the output Q. This effect will then cause signal Y to much more quickly and rapidly bring the output Q to its desired point value.

In summary as seen in FIG. 12, there is a flow chart showing a possible operation of the present system in an actual implementation. The user, in FIG. 12, selects an input desired frequency value (step i) as determined by the signal A. Then the difference value of X is created (step ii) as the difference between the A signal and the feedback signal C.

Then, the exponential relationship generator logic step (iii) is used to execute a control signal $Y=2^{X+1}-1$. This output will drive the output clock circuit (step iv) in order to create the desired output clock rate at step (v), while at the same time, the feedback signal (the C signal) is derived by monitoring the output clock frequency in order to send feedback to the block step (ii) which creates the different signal X=(A−C).

Described herein has been a system and method for the digital implementation of a preliminary control signal (implemented in digital bits), which then can be exponentially expanded into a much larger and sensitive digital output signal (of a greatly expanded number of digital bits) thus, to enable a digital output device to be controlled with very great accuracy in a digital fashion, thus obviating the need to use the standard analog-type signals of earlier implementations.

While the described embodiment illustrates the implementation of the inventor, it is to be understood that other embodiments may be encompassed by the invention as defined in the attached claims.

What is claimed is:

1. A method for exponentially expanding the digital signal value of a first valued input digital signal (X) into a second-valued digital output signal (Y) for controlling the setting of a target digital module (D) whereby Y is a dependent variable exponentially related to a digital signal X where X represents the difference between a set-point signal A and a feedback signal C, said method comprising the steps of:

(a) generating a difference signal X on bus lines of n digital bits where X is the value of said set-point signal (A) reduced by said feedback signal (C) from said target digital module (D);

(b) utilizing said input digital signal (X) plus the integer 1 as an exponent of the base "2" in a gating unit as input to develop a digital output control signal Y on output bus lines of n+q bits for exponentially expansive control of said target digital module, (D), by implementing the sequence of $Y=2^{X+1}-1$.

2. The method of claim 1 which includes the step of:

(c) converting said digital output signal Y to an exponentially expansive voltage value for control of said target digital module back to a set-point which will make X=0.

3. A system for digitally generating a control signal for a target module utilizing an exponential expansion logic circuit for increasing an N bit digital input signal to an N+q bit digital output signal, said system comprising:

(a) means to develop a digital difference signal X an input bus of N bit lines where X represents the digital difference value between a set-point signal A reduced by a feedback signal C from said target module;

(b) means to utilize the binary base "2" raised to the X+1 power for developing a value which is reduced by "1" to generate a resultant digital output signal Y of N+q bits where q represents a digital offset value corresponding to the exponential digital value of X.

4. The system of claim 3 where said means to develop a digital difference signal X includes:

(a1) means to generate said digital set-point signal A by an operator through a digital signal generator;

(a2) means to sense the deviation of said target module from a desired set-point generated by said signal A to provide said digital difference signal X.

5. The system of claim 3 where said means to utilize the base 2 raised to the X+1 power includes:

(b1) programmable array logic (PAL) means providing a combination of AND-OR logic gates for transforming said N bit input X signal to an N+q bit output signal Y and for solving the equation $Y=2^{X+1}-1$.

6. The system of claim 5 wherein said programmable array logic means includes:

(b1a) means for utilizing said N bit digital input signal X as input to develop said N+q bit digital output signal Y for control of said target module at a desired setting.

7. A method for developing an output digital control signal Y for controlling a target device (D) where signal Y is an exponentially expanded value of an input digital signal (X) which represents the difference between a digital set-point signal (A) and a digital feedback signal (C) comprising the steps of:

(a) generating a digital difference signal X as the digital difference between a set-point signal (A) and a feedback signal (C), said signal X designated as a digital input signal to a logic gating unit;

(b) feeding said logic gating unit with "mi" digital input lines of said digital input signal X;

(c) retrieving from said logic gating unit, which executes the equation of $Y=2^{X+1}-1$, an output control signal Y of "mo" digital lines where "mo" is larger in numerical value than "mi".

8. The method of claim 7 which further includes the step of:

(d) transmitting said output control signal Y to a target device (D).

* * * * *